United States Patent
Trommer et al.

[11] Patent Number: 5,566,777
[45] Date of Patent: Oct. 22, 1996

[54] UPSET TUBE

[75] Inventors: Jörg Trommer, Neunkirchen-Seelscheid; Markus Eschbach, Overath, both of Germany

[73] Assignees: GKN Automotive AG, Lohmar; Löhr & Bromkamp GmbH, Offenbach am Main, both of Germany

[21] Appl. No.: 159,433

[22] Filed: Nov. 29, 1993

[30] Foreign Application Priority Data

Nov. 30, 1992 [DE] Germany .................. 42 40 237.9

[51] Int. Cl.$^6$ ............... B60K 17/22; B60R 19/34
[52] U.S. Cl. ............... 180/232; 188/371; 188/377; 280/777; 280/784; 293/133; 293/155; 296/189; 464/179
[58] Field of Search ................. 180/232, 376; 280/777, 784; 188/371, 374, 376, 377; 464/179, 183; 293/132, 133, 155; 296/189

[56] References Cited

U.S. PATENT DOCUMENTS

| 3,599,757 | 8/1971 | Takamatsu et al. | 293/133 X |
| 3,903,982 | 9/1975 | Van Winsen et al. | 180/232 X |
| 3,912,295 | 10/1975 | Eggert, Jr. | 293/133 X |
| 4,312,430 | 1/1982 | Ohtani | 188/377 |

FOREIGN PATENT DOCUMENTS

| 2238341 | 2/1975 | France . |
| 2156783 | 5/1973 | Germany . |
| 4127597 | 9/1992 | Germany . |
| 4113709 | 10/1992 | Germany . |
| 63-2725 | 1/1988 | Japan . |

Primary Examiner—Andrew C. Pike

[57] ABSTRACT

An upset tube for accommodating impact energy in a motor vehicle, preferably head-on collisions, which may be used both in the bumper bar or propeller shaft of a motor vehicle, has one bead angled with sides with different angular values. The angles enable a predetermination of the region of nominal fracture. After having been sheared off, the upset tube is able to destroy a defined amount of friction energy.

8 Claims, 3 Drawing Sheets

UPSET TUBE

BACKGROUND OF THE INVENTION

The invention relates to an upset tube for accommodating impact energy in the case of a motor vehicle.

There exist prior art tubes which are produced by reverse drawing whose purpose is to accommodate part of the impact energy in the case of a head-on collision German Laid Open Publication No. 2156783. However, a disadvantage of this design is that it requires a high axial reverse drawing force which adversely affects the distribution of the impact energy as a function of the distance of deformation. Furthermore, only a short distance of deformation is available.

SUMMARY OF THE INVENTION

It is an object of the present invention to provide an upset tube in which case the upsetting forces are relatively low and which provides a practically unlimited distance for accommodating impact energy.

In accordance with the invention, along the axial length of the upset tube, a radially inwardly directed bead is arranged, and the angle of one side of the bead is greater than the angle of the other side of the bead.

The tube design in accordance with the invention ensures that in a collision, the upset tube tears in the region of the greater side angle of the bead. In this way, the behavior of the tube after a collision is clearly defined.

In an advantageous embodiment of the invention, the inner diameter of the upset tube at one axial end of the bead is smaller than the outer diameter of the upset tube at the other axial end of the bead. By designing the tube in this way it is possible for the two halves of the upset tube to slide one inside the other after the tube has been destroyed. The high friction values occurring as a result of the difference in diameters ensure that a considerable part of the impact energy is accommodated. In the case of extreme differences in diameter, the tube part with the greater diameter may burst, as a result of which an almost unlimited distance of deformation is available.

According to a further embodiment of the invention, the upset tube is manufactured from steel. This material is advantageous if the upset tube is expected to exhibit high strength values. According to a further advantageous embodiment of the invention, the upset tube is manufactured from aluminum. This material is advantageous if it is especially important to save weight.

According to a further feature of the invention, the wall thickness in a location arranged in the region of the bead between the vertex of the bead and the undeformed part of the upset tube is reduced at the bead side with the greater angle. In this way, the force peak can be varied. According to a further advantageous embodiment, the wall thickness of the bead in the region of the vertex is increased. This measure compensates for the reduced resistance moment occurring in the region of the radially inwardly directed bead.

According to a further feature of the invention, it is proposed that the upset tube is inserted into a bumper bar of a motor vehicle. An advantage of this application is that the upset tube becomes effective at the very beginning of the head-on collision.

According to a further feature of the invention, the upset tube is inserted into the propeller shaft of a motor vehicle for the purpose of transmitting torque from a drive unit to an axle. With this embodiment, the upset tube becomes effective as soon as the engine starts to move in the direction of the passenger compartment.

From the following detailed description taken in conjunction with the accompanying drawings and subjoined claims, other objects and advantages of the present invention will become apparent to those skilled in the art.

BRIEF DESCRIPTION OF THE DRAWINGS

Below the invention will be explained in greater detail with reference to the embodiments illustrated in the drawing wherein.

DETAILED DESCRIPTION OF THE PREFERRED EMBODIMENTS

Figure 1:
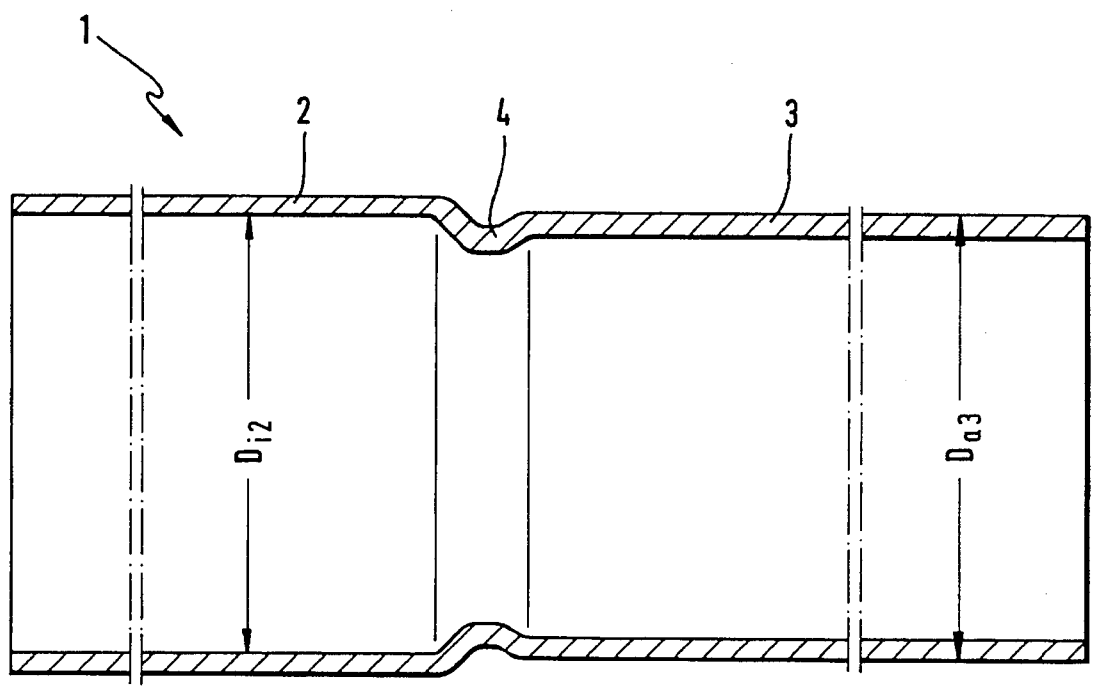
FIG. 1 is a longitudinal sectional view through an upset tube.

The upset tube 1 shown in FIG. 1 consists of two tube parts 2 and 3 separated by the bead 4.

Figure 2:
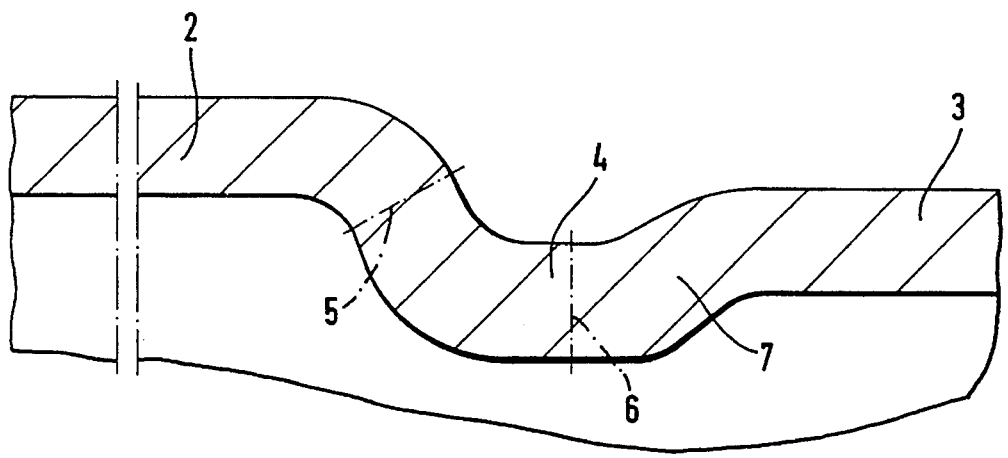
FIG. 2 is a longitudinal sectional view in an enlarged scale, through the region of the bead.

In FIG. 1 $D_{i2}$ marks the inner diameter of the upset tube on one axial side of the bead and $D_{a3}$ marks the outer diameter of the tube on the other axial side of the bead 4. As marked in mathematical terms the outer diameter of the one end may be greater than the inner diameter of the other end in a preferred embodiment. In FIG. 2 the bead is shown in an enlarged scale in detail.

Figure 4:
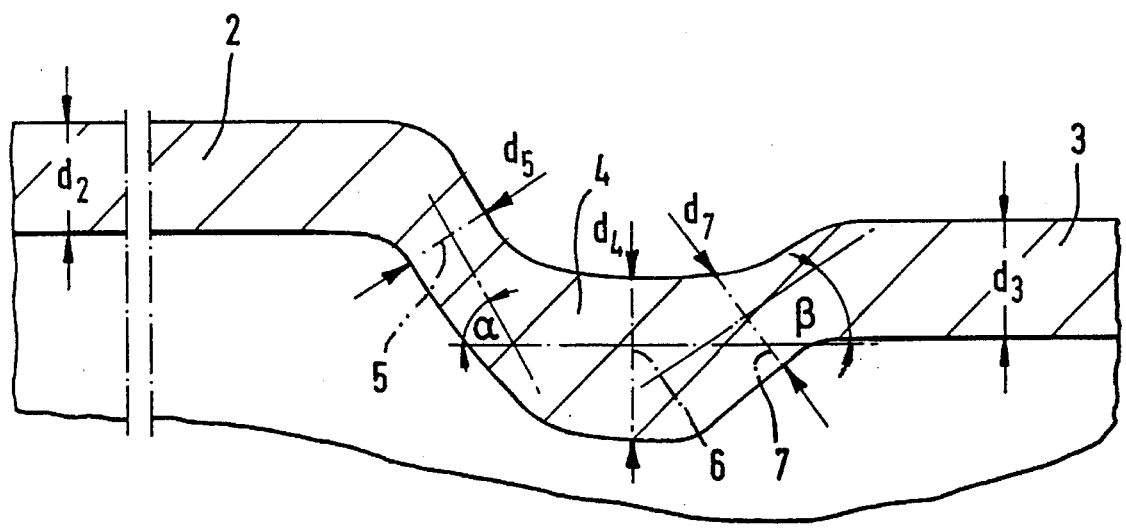
FIG. 4 is a view like FIG. 2 which shows the different angles of the sides of the bead.

The bead itself comprises two flanks with different side angles $\alpha$ and $\beta$, as seen in FIG. 4, with the side angle $\alpha$ being greater than the side angle $\beta$, in order to ensure a defined region of fracture.

The outer diameters $D_{a3}$ of the tube part 3 of the upset tube is preferably greater than the inner diameter $D_{i2}$ of the other part of the upset tube 1. In this way it is ensured that after the upset tube has been sheared off in the region 5, the part 3 slides into the part 2, with a defined amount of friction energy being destroyed as a result of the diameter conditions.

Figure 3:
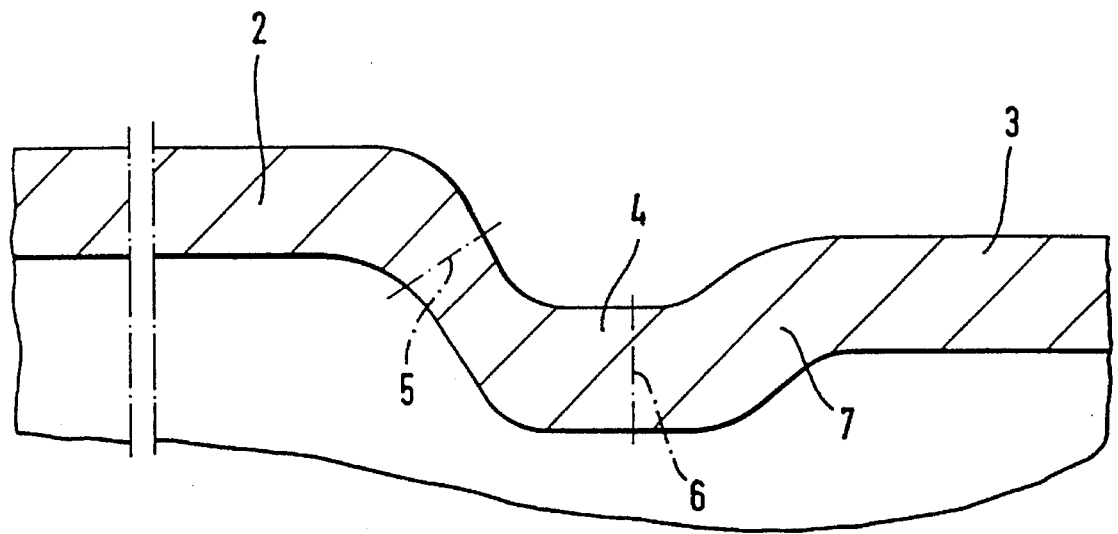
FIG. 3 is an alternative embodiment of a longitudinal section view in an enlarged scale through the region of the bead.

Especially in region 5, in the region of the nominal fracture or the region between the bead vertex 6 and undeformed part of the upset tube, the wall thickness of the tube may be reduced by up to 30% in order to reduce the shear impact occurring (See FIG. 3). Furthermore, on its own or additionally, the wall thickness may be increased at the vertex 6.

The angle $\alpha$ of the flank on the one side of the bead is preferably 45°, and the angle $\beta$ of the flank on the other side of the bead, preferably, amounts to 30°.

In FIG. 4 the wall thickness of the first tube part 2 is marked by $d_2$ the wall thickness of the first flank 5, marking the greater angle $\alpha$ with respect to the longitudinal direction, is marked by $d_5$. The wall thickness in the region of the vertex 6 of the bead is marked by $d_4$. The wall thickness of the flank 7, marking the smaller angle $\beta$ with respect to the longitudinal direction, is marked by $d_7$ and the wall thickness of the second tube part 3 of smaller diameter of the tube is marked by $d_3$. As shown in three mathematical terms, on its own or in combination, angle $\alpha$ preferably is greater than angle $\beta$; thickness $d_5$ is smaller than thickness $d_2$ and thickness $d_3$; thickness $d_4$ is greater than thickness $d_2$ and thickness $d_3$. Thus, $D_{a3}>D_{i2}$, $\alpha>\beta$ $d_5<d_2, d_3$, and $d_4>d_2, d_3$.

Figure 5:
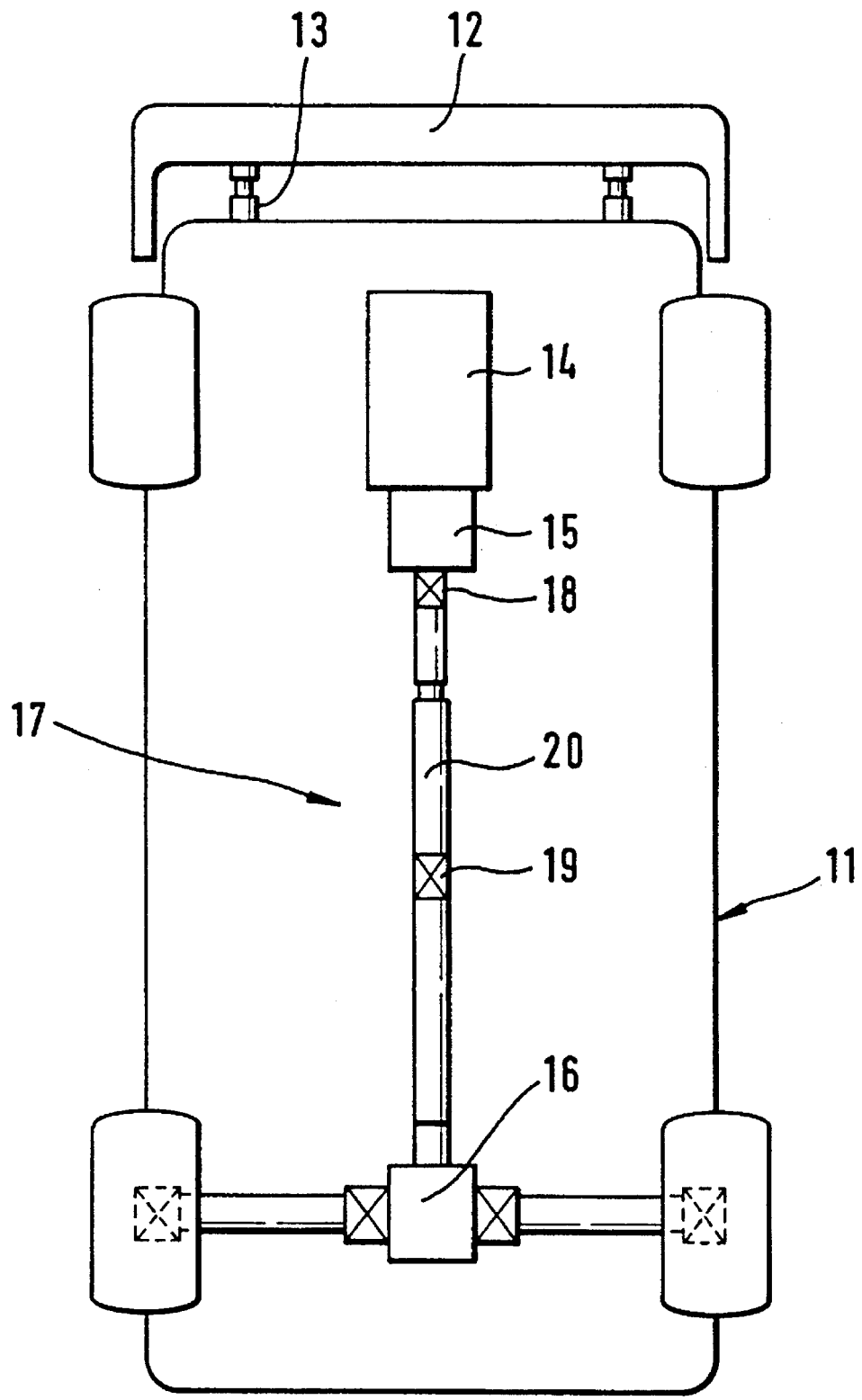
FIG. 5 is a schematic view of a vehicle with the embodiment of the present invention.

In FIG. 5 a car 11 is diagrammatically shown including an outline having a bumper bar 12. The bumper bar 12 is held to the body of the car by two upset tubes 13. The car 11 comprises a front engine 14, a gearbox 15, and a rear differential gear 16. There is a driveshaft 17 between the gearbox 15 and the differential gear 16 comprising two constant velocity joints 18, 19 and at least one upset tube 20.

While the above detailed description describes the preferred embodiment of the present invention, the invention is susceptible to modification, variation, and alteration without deviating from the scope and fair meaning of the subjoined claims.

We claim:

1. A metallic upset tube having an axial length for accommodating impact energy of a motor vehicle comprising:

a radially inwardly directed bead within the axial length of the metallic upset tube, said bead comprising two inwardly directed flanks along a longitudinal direction immediately adjacent to and separating a first cylindrical tube part from a second cylindrical tube part wherein one of said cylindrical tube parts defines a maximum diameter and said flanks being angled on both axial ends such that a first angle ($\alpha$) of one of the flanks of the bead is greater than a second angle ($\beta$) of another of the flanks of the bead.

2. The upset tube according to claim 1, wherein an inner diameter of the first cylindrical tube portion of the upset tube at one of the axial ends of the bead is smaller than an outer diameter of the second cylindrical tube part of the upset tube at the other of the axial ends of the bead.

3. The upset tube according to claim 1, wherein said tube is manufactured of steel.

4. The upset tube according to claim 1, wherein said tube is manufactured from aluminum.

5. The upset tube according to claim 1, wherein a wall thickness of the tube in a location arranged within the bead between a vertex of the bead and either said first or second cylindrical tube parts of the upset tube is reduced at the bead flank with the greater angle.

6. The upset tube according to claim 1, wherein a wall thickness of the bead in a region of a vertex is increased.

7. A combination of a bumper bar of a motor vehicle and at least one metallic upset tube having an axial length for accommodating impact energy of the motor vehicle, wherein:

said upset tube includes a radially inwardly directed bead within the axial length of the metallic upset tube, said bead comprising two inwardly directed flanks along a longitudinal direction immediately adjacent to and separating a first cylindrical tube part from a second cylindrical tube part wherein one of said cylindrical tube parts defines a maximum diameter and said flanks being angled on both axial ends such that a first angle ($\alpha$) of one of the flanks of the bead is greater than a second angle ($\beta$) of another of the flanks of the bead; and said bumper bar is held to a body of the motor vehicle by said upset tube.

8. A combination of a propeller shaft of a motor vehicle and at least one metallic upset tube having an axial length for accommodating impact energy of the motor vehicle, wherein:

said upset tube including a radially inwardly directed bead within the axial length of the metallic upset tube, said bead comprising two inwardly directed flanks along a longitudinal direction immediately adjacent to and separating a first cylindrical tube part from a second cylindrical tube part wherein one of said cylindrical tube parts defines a maximum diameter and said flanks being angled on both axial ends such that a first angle ($\alpha$) of one of the flanks of the bead is greater than a second angle ($\beta$) of another of the flanks of the bead; and said upset tube is included in the propeller shaft of the motor vehicle.

\* \* \* \* \*

UNITED STATES PATENT AND TRADEMARK OFFICE
CERTIFICATE OF CORRECTION

PATENT NO. : 5,566,777
DATED : October 22, 1996
INVENTOR(S) : Jörg Trommer and Markus Eschbach It is certified that error appears in the above-indentified patent and that said Letters Patent is hereby corrected as shown below:

Column 3, line 9, after "$\alpha > \beta$" insert --,--

Signed and Sealed this

Eighteenth Day of March, 1997

*Attest:*

BRUCE LEHMAN

*Attesting Officer*      *Commissioner of Patents and Trademarks*